United States Patent Office 3,049,401
Patented Aug. 14, 1962

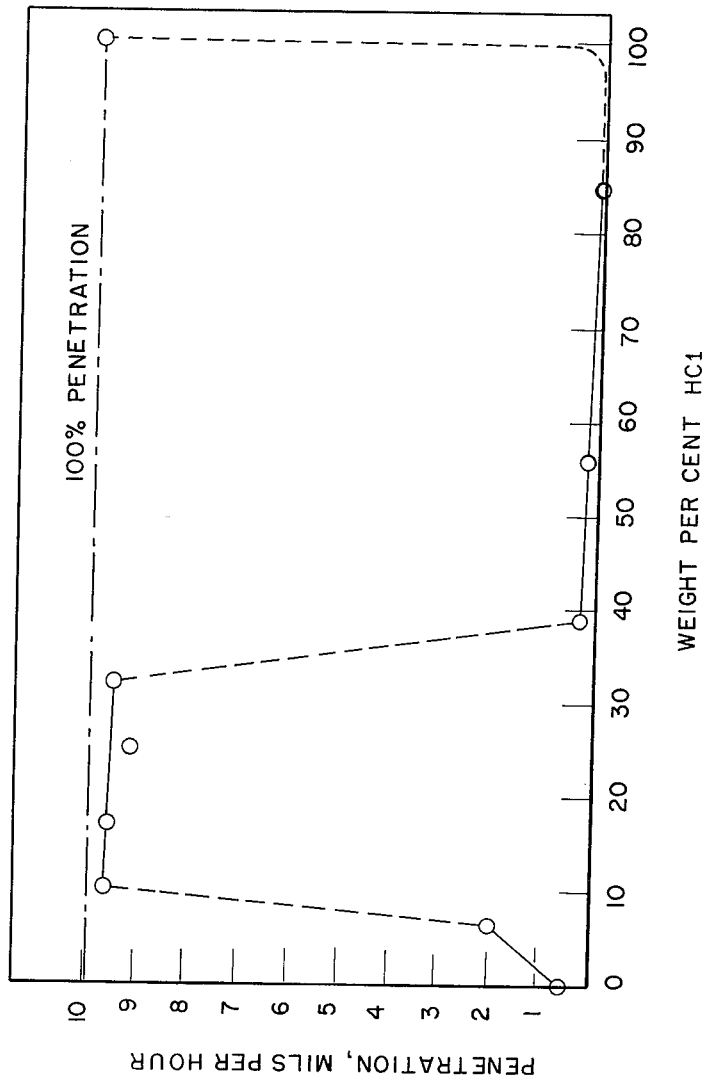

3,049,401
PROCESS FOR DISSOLVING BINARY URANIUM-ZIRCONIUM OR ZIRCONIUM-BASE ALLOYS
Albert A. Jonke, Elmhurst, John J. Barghusen, Joliet, and Norman M. Levitz, Bellwood, Ill., assignors to the United States of America as represented by the United States Atomic Energy Commission
Filed Nov. 4, 1960, Ser. No. 67,446
4 Claims. (Cl. 23—14.5)

This invention deals with the dissolution of zirconium metal and zirconium-base alloys, such as zirconium-uranium alloys, and in particular with the dissolution of a cladding formed of such zirconium-base metals around a core of uranium dioxide. Uranium cores clad with a zirconium-base metal are used as fuel elements in nuclear reactors, among others in the Dresden Nuclear Power Reactor. Details on the Dresden Nuclear Power Reactor are given in Nucleonics of December 1959. The zirconium alloy most frequently used for cladding uranium or uranium oxide fuel elements is the so-called Zircaloy-2, which contains from 1.2 to 1.6% by weight of tin, from 0.08 to 0.17% of iron, from 0.06 to 0.14% of chromium, from 0.03 to 0.07% of nickel, and less than 0.09% of nitrogen, the balance being zirconium. The invention is also applicable to zirconium that contains a low percentage of uranium as it is employed in some reactors as fuel material.

Aqueous acids have been used for dissolving the zirconium cladding or jacket from fuel elements; for instance, hydrofluoric acid in about stoichiometric quantities has been chosen. Also, hydrofluoric acid containing an oxidizing agent has been investigated. However, these aqueous acids have the drawback that both the uranium tetrafluoride and the zirconium fluoride are obtained in an aqueous solution and have to be recovered therefrom in an anhydrous form for most purposes.

Gaseous acids such as hydrochloric acid have also been considered; the hydrochloric acid has been found to dissolve zirconium or zirconium alloys at a satisfactory rate at temperatures of about 400° C. However, the zirconium tetrachloride sublimes at about 300° C. and thus "volatilizes" at the chlorination temperature; this zirconium tetrachloride carries radioactive fission products along which condense on the apparatus walls. This makes shielding necessary. It was then tried to use anhydrous hydrogen fluoride at elevated temperature, but dissolution with this medium was found to be unfeasibly slow.

It is an object of this invention to provide a process of dissolving zirconium and zirconium-base alloys which takes place at a sufficiently high rate and in which the zirconium is recovered immediately in the reactor in the form of solid zirconium fluoride.

It is another object of this invention to provide a process for the dissolution of a cladding of zirconium metal or zirconium-base alloy from a core of uranium dioxide in which the uranium dioxide is not attacked.

It has been found that an anhydrous mixture of hydrogen fluoride plus a critical amount of hydrogen chloride dissolves zirconium-base metals at a radically increased rate. The hydrogen chloride functions as a quasi catalyst. It first converts the zirconium to the chloride, which then reacts with the hydrogen fluoride and precipitates as solid zirconium fluoride; the hydrogen chloride is thereby regenerated for further reaction. Uranium alloyed with the zirconium is also obtained in the form of solid tetrafluoride. A uranium dioxide core, however, remains unattacked.

The process of this invention thus comprises contacting at elevated temperature, preferably between 400 and 550° C., the zirconium-metal-containing article with a mixture of anhydrous hydrogen fluoride and anhydrous hydrogen chloride in the quantity of from 10 to 32% by weight, which is critical as will be shown later, whereby first gaseous zirconium tetrachloride is formed and the latter is converted to the tetrafluoride which precipitate from the gas in solid form.

As mentioned, the concentration of the hydrogen chloride in the gas mixture is critical. This is obvious from the attached drawing which illustrates the relationship between dissolution rate (expressed in mils of penetration per hour) and weight percent of hydrogen chloride present in the hydrogen fluoride gas. The experiments leading to this diagram of the drawing are summarized in Example I.

*Example I*

Ten 20-mil thick coupons of Zircaloy-2, which were surface-oxidized in an autoclave with steam at 350° C. for four days, were used. Autoclaving was done to simulate Zircaloy-clad fuel elements as they are obtained after neutron-bombardment in a nuclear reactor. Each coupon was exposed to gaseous anhydrous acid of different composition for three hours at 400° C.

It is evident from the diagram that the hydrogen chloride concentration of between 10 and 32% yields drastically improved results and that with acids of this concentration within the first hour about 90% of the metal were dissolved, since the penetration from either side was between 9 and 10 mils. The compound obtained in all nine cases where hydrogen fluoride was present, whether in pure form or in a mixture with hydrogen chloride, was a granular zirconium tetrafluoride. In the tenth run, where pure hydrogen chloride gas was used at about 375° C., the product obtained was gaseous zirconium chloride.

While the article of zirconium metal can be contacted with the gas mixture in any way known to those skilled in the art, the applicants preferred to use the so-called fluidized-bed procedure, as it is described, for instance, in copending application Serial No. 658,901, filed by Stephen Lawroski et al. on May 13, 1957 and patented on April 25, 1961, as U.S. Patent No. 2,981,592. A fluidized bed is obtained by passing a gas upwardly through a bed of solid particles at a sufficient velocity to separate the particles from each other and to maintain them out of contact. In this condition a certain degree of freedom to move is imparted to the solid particles so that the solid-gas mixture behaves much like a liquid and has the ability to flow under the influence of a hydrostatic head.

According to this fluidized-bed process, a powdered inert material, such as calcium fluoride, refractory aluminum oxide, magnesium fluoride or any other material inert to the gas mixture and solid at the reaction temperature, is fluidized; the powder functions as a heat transfer medium and at the same time in the process of this invention as an erodent whereby the fluoride formed is removed from the article and new surfaces are exposed for further reaction.

The article to be treated is supported in the reaction container by known means, such as a hook or a basket, and the calcium fluoride or other powder is kept in suspension in a gas-like manner; the gas mixture is introduced at the bottom of the reactor.

In the following, a few additional examples will now be given to illustrate the process of this invention further.

*Example II*

A coupon of Zircaloy-2 surface-oxidized like those of Example I was treated in a fluidized bed of calcium fluoride with anhydrous hydrogen fluoride gas at 550° C. The penetration rate was 1.6 mils per hour. Another identical coupon was contacted, also on a calcium fluoride bed, with an anhydrous gas mixture of 83% by weight of hydrogen fluoride and 17% by weight of hydrogen chloride. In this instance the penetration rate was 15 mils per hour.

*Example III*

Another experiment was carried out with a 30-mil thick Zircaloy–2 tubing filled with sintered uranium dioxide pellets. The assembly was contacted with anhydrous hydrogen fluoride containing 10% by volume of hydrogen chloride at 500° C. After two hours the tubing was completely dissolved, but the uranium dioxide pellets remained unaffected.

*Example IV*

A fluidized bed was used again of calcium fluoride having a particle size of between −60 and +325 mesh. The calcium fluoride was fluidized in a 1½-inch wide Monel reactor with the gas mixture of a velocity of from 0.3 to 0.41 feet per second. Five runs were carried out using different hydrogen fluoride gas compositions. For runs 1–4, Zircaloy coupons were used each of which weighed about four grams; they had been autoclaved with steam for four days at 350° C. For run 5 a coupon of uranium-zirconium alloy (1.5% by weight of uranium) was used that weighed 19.2 grams. All runs were carried out for four hours. Other operating conditions and the penetration rate of each run are compiled in the table below.

| Run Number | Temperature (° C.) | HF (vol. percent) | HCl (vol. percent) | Penetration Rate (mil/hr.) |
|---|---|---|---|---|
| 1 | 525 | 100 | | 1.6 |
| 2 | 550 | 89 | 11 | a >15 |
| 3 | 445 | 95 | 5 | 5 |
| 4 | 505 | b 44 | b 5 | (a) |
| 5 | 505 | 91 | 9 | a >11 | a Coupon completely corroded.
b Gas stream contained 51 volume percent nitrogen as diluent.

Also these experiments clearly show that hydrogen fluoride alone is not as effective as a mixture of it with hydrogen chloride.

It was found in the above runs that the penetration rate in the first half of dissolution was not slower than that in the second part, which indicates that the oxide layer dissolves just as easily as the Zircaloy. It is also obvious that the process yields equally good results for a uranium-containing zirconium alloy. Runs 3 and 4, for which a hydrogen chloride concentration of only 5% was used, yielded already radically improved dissolution rates as compared with run 1 where no hydrogen chloride was employed. In fact, run 4, which was operated with the low hydrogen chloride content, resulted in complete dissolution within the four hours.

*Example V*

Again a fluidized bed of calcium fluoride was used. The reactor had a diameter of six inches, and the operating temperature was 505° C. The gas was anhydrous hydrogen fluoride containing 13% by volume of hydrogen chloride, and treatment was carried out for 7½ hours.

The article to be dissolved was an assembly made of a binary zirconium alloy containing 1% by weight of uranium. The assembly had an over-all size of 1¾″ x 2½″ x 6¾″ and it weighed 1.9 kg. It consisted of ten plates, each ³⁄₃₂″ thick, which were arranged in a sandwich-like manner and so that a space of ⁵⁄₆₄″ was retained between each plate. This was accomplished by welding the plates to ³⁄₁₆″-thick side plates of the same composition as the other ten plates. After the 7½ hours, about 50% of the assembly was reacted. The side plates were almost completely corroded, and the two outside plates were fully corroded; only fractions of the other eight plates remained. The spaces between the remaining plate fractions were filled with zirconium tetrafluoride which probably in the latter part prevented access of the acid and thus completion of the reaction.

If the material treated by the process of this invention was a uranium-zirconium alloy, a uranium tetrafluoride-zirconium tetrafluoride mixture is the product. This mixture can then be processed furthermore with fluorine gas whereby the uranium fluoride is converted to the hexafluoride and volatilized as such, as is known to those skilled in the art.

It will be understood that this invention is not to be limited to the details given herein but that it may be modified within the scope of the appended claims.

What is claimed is:

1. A process of dissolving zirconium-base metals selected from the group consisting of binary uranium-zirconium alloys and zirconium-base alloys containing from 1.2 to 1.6 percent by weight of tin, from 0.08 to 0.17 percent by weight of iron, from 0.06 to 0.14 percent by weight of chromium, from 0.03 to 0.07 percent by weight of nickel and less than 0.009 percent by weight of nitrogen, the balance being zirconium, comprising contacting said metal with an anhydrous gaseous mixture of hydrogen fluoride and from 10 to 32% by weight of hydrogen chloride at between 400 and 550° C. whereby solid zirconium fluoride is formed and precipitated.

2. The process of claim 1 wherein the zirconium-base metal and the gaseous mixture are reacted in a space in which a finely divided inert powder is suspended in a fluidized condition.

3. The process of claim 2 wherein the powder is calcium fluoride.

4. A process of dejacketing a fuel element of a nuclear reactor consisting of a uranium dioxide core and a jacket of a zirconium-base metal containing from 1.2 to 1.6 percent by weight of tin, from 0.08 to 0.17 percent by weight of iron, from 0.06 to 0.14 percent by weight of chromium, from 0.03 to 0.07 percent by weight of nickel and less than 0.009 percent by weight of nitrogen, the balance being zirconium, said process comprising placing said fuel element into a space in which finely divided calcium fluoride is being fluidized, and introducing an anhydrous gaseous mixture of hydrogen fluoride and from 10 to 32% by weight of hydrogen chloride into said space at a temperature of between 400 and 550° C. whereby said gaseous mixture reacts with the zirconium-base metal and solid zirconium fluoride is formed and deposited on said calcium fluoride while the core remains unattacked.

References Cited in the file of this patent

UNITED STATES PATENTS

| | | |
|---|---|---|
| 2,602,725 | Wilhelm et al. | July 8, 1952 |
| 2,907,630 | Lawroski et al. | Oct. 6, 1959 |

OTHER REFERENCES

TID–7534, book 1, pages 244, 245, 252–255, May 25, 1957. Copy in POSL.

ANL–6145, pages 119 and 120, March 1960. Copy in POSL.